United States Patent
Blijleven et al.

Patent Number: 5,216,741
Date of Patent: Jun. 1, 1993

[54] METHOD OF POSITIONING AND FIXING OPTICAL FIBRES IN A ROW OF OPTICAL FIBRES AND A COUPLING DEVICE PROVIDED WITH SUCH A ROW OF FIBRES

[75] Inventors: Nicolaas Blijleven, The Hague; Martinus B. J. Diemeer, Zoetermeer, both of Netherlands

[73] Assignee: Koninklijke PTT Nederland N.V., Groningen, Netherlands

[21] Appl. No.: 845,199

[22] Filed: Mar. 3, 1992

[30] Foreign Application Priority Data

Mar. 8, 1991 [NL] Netherlands ............ 9100424

[51] Int. Cl.⁵ .................................. G02B 6/36
[52] U.S. Cl. ............................. 385/137; 385/80; 385/85; 65/4.3
[58] Field of Search ............... 385/76, 77, 78, 80, 385/83, 85, 95, 97, 114, 115, 136, 137; 156/179, 180; 65/4.1, 4.2, 4.21, 4.3

[56] References Cited

U.S. PATENT DOCUMENTS

| | | | |
|---|---|---|---|
| 4,029,390 | 6/1977 | Chinnock et al. | 385/137 X |
| 4,529,266 | 7/1985 | Debelecque | 385/137 |
| 4,647,147 | 3/1987 | Pikulski et al. | 350/96.17 |
| 4,725,297 | 2/1988 | Grigsby et al. | 65/4.2 |
| 4,980,007 | 12/1990 | Ferguson | 156/179 |
| 5,109,460 | 4/1992 | Baek et al. | 385/115 |
| 5,155,787 | 10/1992 | Carpenter et al. | 385/98 |

FOREIGN PATENT DOCUMENTS

| | | |
|---|---|---|
| 0176623A1 | 4/1986 | European Pat. Off. |
| 0178761 | 4/1986 | European Pat. Off. |
| 0122169B1 | 6/1990 | European Pat. Off. |
| 0417857A1 | 3/1991 | European Pat. Off. |
| 3422972A1 | 1/1986 | Fed. Rep. of Germany |
| 3424602A1 | 1/1986 | Fed. Rep. of Germany |
| 3606682C1 | 6/1987 | Fed. Rep. of Germany |
| 2849975C2 | 10/1987 | Fed. Rep. of Germany |
| 3815459A1 | 11/1989 | Fed. Rep. of Germany |
| 8913075.8 | 2/1990 | Fed. Rep. of Germany |
| 2411424 | 6/1979 | France |
| 53-123154 | 10/1978 | Japan |
| 54-34845 | 3/1979 | Japan |
| 57-161807(A) | 5/1982 | Japan |
| 59-129807(A) | 7/1984 | Japan |
| 61-138210(A) | 6/1986 | Japan |
| 63-202703(A) | 8/1988 | Japan |

*Primary Examiner*—Frank Gonzalez
*Attorney, Agent, or Firm*—Frishauf, Holtz, Goodman & Woodward

[57] ABSTRACT

A planar row of optical fibres (9) is obtained by placing the fibres in a mutually parallel position situated contiguously alongside one another. For this purpose, the fibres (9) are placed alongside one another on a substrate (1) in a groove (6) having a laterally somewhat elastic boundary (2, 3) at an accurately determined spacing (D), which is somewhat less than the sum of the diameters of the fibres (9), and then smoothing them and pressing them down so as to be free of crossovers with the aid of a small plate (5) having a thickness D. The spaces left over in the groove (6) are filled with curing filling material. A coupling device for coupling the fibres (9) to corresponding optical channels is obtained by sawing through (along line A—A) and machining the sawn surface obtained.

8 Claims, 1 Drawing Sheet

METHOD OF POSITIONING AND FIXING OPTICAL FIBRES IN A ROW OF OPTICAL FIBRES AND A COUPLING DEVICE PROVIDED WITH SUCH A ROW OF FIBRES

BACKGROUND OF THE INVENTION

1. Field Of The Invention

The invention is in the field of coupling optical guides. More particularly, the invention relates to a method of positioning and fixing optical fibres in a row of optical fibres such as is used in a coupling device to couple a number of optical fibres to a corresponding number of optical channels, and to a coupling device provided with such a row of fibres.

2. Prior Art

In optical networks, in which the transmission of light signals takes place via glass fibre links, integrated optical components are being used evermore frequently to generate, process, switch, etc. the light signals in such networks. In this connection, it is necessay for there to be lightguide channels, which can be coupled to the glass fibres, in the optical components for coupling the light signals in and out. For this purpose, the lightguide channels in the optical components are made as equal as possible geometrically and optically, but at least in terms of modal field diameter, to the glass fibres to be coupled thereto. A link having only low losses is possible without the need to use coupling lenses if each pair of optical waveguides to be coupled, in this case a lightguide channel and a glass fibre, are glued to each other in mutual alignment by means of well polished end faces which are usually chosen at right angles. In such a coupling, three mismatches may give rise to undesirable coupling losses, namely a transverse displacement, a longitudinal displacement and an angular rotation of the optical waveguides with respect to each other. On a chip, integrated optical components are usually so designed that a number of optical waveguide channels to be coupled emerge at the edge of the chip into a common coupling face in which the said end faces of the channels are situated. In the vicinity of said coupling face, said channels form a planar row of parallel optical waveguides placed close together. This makes it difficult to couple every channel in the coupling face separately to a glass fibre with sufficient accuracy. In order to avoid such separate coupling, use is in fact made of a coupling device which comprises a substrate on which a number of optical fibres to be coupled are situated with one end positioned and fixed in such a way that the cores of the fibres can be integrally aligned in the coupling face with the waveguide channels on the chip, while the fibres have sufficient room at their other end for separate coupling to other optical fibres. Such coupling devices are known, for example, from references [1] to [6] referred to below under C. In said known coupling devices, referred to as glass fibre arrays, the fibre ends, preferably stripped of their primary coating, of a number of parallel optical fibres lie fixed and positioned in a housing at a mutually very accurate centre-to-centre distance. In that case, the housing is formed by two parallel clamping plates, a base plate and a cover plate, between which the fibres are clamped. Two techniques are known for the accurate mutual positioning of the fibres. A first technique, as disclosed by reference [1], makes use of accurately positioned grooves provided in the base plate, in which grooves the fibres are laid during manufacture and then fixed by gluing the cover plate thereon. The use of grooves, which have to be produced beforehand, for positioning the optical fibres and the placing of each fibre separately in such a groove make this first technique for manufacturing said coupling devices fairly laborious and expensive, certainly in the case of large numbers of fibres, for example 10 or more. In addition, the coupling devices obtained therewith are not very compact. However, a greater compactness, accompanied by a less laborious manufacture, can be achieved if, for the accurate mutual positioning of the fibres, use is made of the fact that the current generation of optical fibres is manufactured with an accuracy such that the geometrical parameters thereof, such as concentricity, ellipticity and external diameter, are constant within very narrow tolerances. According to a second known technique, the fibres in that case lie very contiguously alongside one another in their housing, with their common lines of contact and the centre lines of the fibres essentially in a flat plane. Three of the references mentioned, namely [2], [3] and [4], disclose designs in which the fibres are clamped between two clamping plates. However, the two clamping plates are now each provided, diametrically with respect to one another, with a stepped layer having a height of approximately the diameter of a fibre so that there is, between the clamping plates, an opening having a rectangular cross section, in which the row of fibres is placed. During the manufacture of the fibre array, the fibres are first placed on the base plate alongside one another with a generous intervening spacing and with the stepped layer on one side. Then the cover plate with its stepped layer is placed on the fibres on their other side an pressed down until a mutual spacing from the base plate somewhat larger than the fibre diameter is reached. Then the base plate and cover plate are successively pushed home horizontally and vertically, as disclosed by reference [2], or, alternatively, in a diagonal direction, as disclosed by reference [3], until the fibres are, as it were, swept together and lie closely adjacent between the two stepped layers. Reference [5] discloses a variant of this in which the cover plate consists of two parts, each provided with a stepped layer, with which the fibres are swept together on the base plate until they lie in the desired closely adjacent position. Reference [6] furthermore also discloses sucking the fibres on via a suction opening in the base plate until they are in the desired position and then pressing them down in said position from above with a cover plate, during which process the space between the base plate and the cover plate on either side of the fibres is filled up with layers comparable to the stepped layers mentioned.

After achieving accurate positioning in this way, the fibres are fixed by further gluing of the parts of the housing and filling up the spaces between the housing parts and the fibres with suitable material, such as casting resin. Then an assembly obtained in this way is sawn through the two clamping plates along a cut perpendicular to the axis of the fibres, and one or each of the two pieces obtained in this process is rendered suitable by polishing for a direct contact coupling to a coupling face of an optical chip.

The manufacture of fibre arrays by the second techique as disclosed by references [2] to [5] inclusive has two problems. First of all, the vertical and horizontal forces which have to be exerted on the clamping plates in order to place the fibres in the closely adjacent position are difficult to adjust independently of one another, with the possible consequence that the fibres start to give way. Problems may also arise in this connection with heating. A second problem is that, if a large number of fibres are laid in parallel alongside one another in a preliminary position, crossovers occur very readily under these circumstances unless a relatively large intervening spacing is chosen at the same time, with the result that the clamping plates have to have a certain excess length solely for the purpose of manufacture. Although the manufacture of fibre arrays by the second technique as disclosed by reference [6] does not have the first problem mentioned, the measures necessary for applying suction forces complicate the manufacture.

SUMMARY OF THE INVENTION

The object of the invention is to eliminate the above-mentioned drawbacks. It achieves this, first of all, by combining two practical findings, namely, on the one hand, that a bundle of somewhat stiff wire-like elements can be smoothed so as to be free of crossovers, and on the other hand, that a flexible gluing of two block-type elements permits a slight parallel, elastic sliding when a transverse force directed along the plane of the gluing is exerted, and an opposite reaction force is therefore generated in this process. It furthermore makes use of the insight that the housing parts of the housing of a row of fibres should be so designed that, with suitable dimensioning of a housing part, said housing part can consequently be used both for smoothing to remove crossovers and in exerting said transverse force. A method of positioning and fixing a number, $N \geq 2$, of optical fibres on an essentially flat substrate at least over a certain length in an essentially flat row and at mutually essentially equal spacings, the fibres lying contiguously alongside one another and the common contact lines and the centre lines of the fibres lying essentially in a flat plane, which method comprises the steps of placing and holding the fibres in position on the substrate, and of providing a curing filling material in the spaces between fibres themselves and between fibres and substrate in order to fix the fibres in said position has for this purpose, according to the invention, the characteristic that the placing and fixing of the fibres in said contiguous position comprises the following steps:

mounting on the substrate two lateral bounding means of which at least one has a certain lateral flexibility and whose mutual spacing is a fraction smaller than the sum of the diameters of said number of optical fibres, a groove being formed between the bounding means for receiving the optical fibres, placing the fibres as far as possible alongside one another on the substrate in the groove, carrying out smoothing movements over the optical fibres in the groove with the aid of a small smoothing plate, which fits closely into the groove and is provided with a smoothing surface, until any crossovers have been removed from the fibres, pressing the fibres down into the groove against the substrate and holding them down with a small pressing-down plate provided with a pressing-down surface, filling the spaces around the small pressing down plate and the fibres in the groove with said curing filling material.

A coupling device for coupling a number of optical fibres to a corresponding number of optical channels, comprising a row of a number, $N \geq 2$, of optical fibres placed contiguously alongside one another at least over a certain length, the common contact lines and the centre lines of the fibres essentially lying in a flat plane, and a housing formed by a number of housing parts which enclose an elongated, essentially block-shaped space having a rectangular cross section with a height of approximately one times the fibre diameter and a width of approximately N times the fibre diameter, in which space the row of fibres is received, has for this purpose, according to the invention, the characteristic that one of the housing parts is plate-like and has an accurately determined thickness approximately equal to, but less than N times the fibre diameter and provided with a side face which touches the fibres in the row of fibres over said length.

REFERENCES

[1] FR-A-2 411 424 entitled: Procédé de raccordement de fibres optiques, et connecteur permettant un tel raccordement (Procedure for joining optical fibres and connector enabling such joining);

[2] EP-A-0 176 623 entitled: Vorrichtung zum Positionieren und Fixieren von Glasfasern, sog. Glasfaserarray (Device for positioning and fixing glass fibres, so-called glass fibre array);

[3] EP-A-0 178 761 entitled: Optical fibre terminations;

[4] DE-C- 3 606 682 entitled: Lichtleitfaseranordnung für mikrooptische Gitter-Multiplexer und Demultiplexer (Lightguide fibre arrangement for microoptical grating multiplexers and demultiplexers);

[5] Patent Abstracts of Japan, vol. 7, No. 2 (P-166)-(1147), Jan. 7, 1983 & JP-A-57 161807 (FUJITSU), Oct. 5, 1982;

[6] Patent Abstracts of Japan, vol. 10. No. 334 (P-515) (2390), Nov. 13, 1986 & JP-A-61 138210 (MATSUSHITA ELECTRIC), Jun. 25, 1986.

BRIEF DESCRIPTION OF THE DRAWING

The invention will be explained below by means of a description of an exemplary embodiment, reference being made to a drawing wherein.

DETAILED DESCRIPTION OF THE INVENTION

Figure 1:
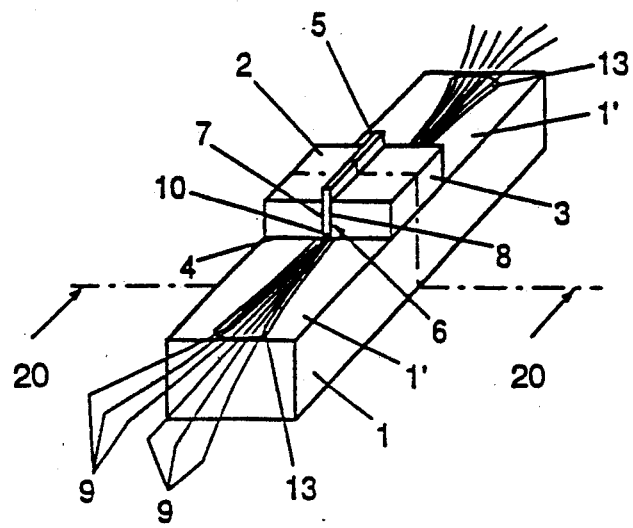
FIG. 1: shows a three-dimensional view of an assembly comprising a row of optical fibres to be positioned and to be fixed, or positioned and fixed, with the aid of the method according to the invention.
Figure 2:
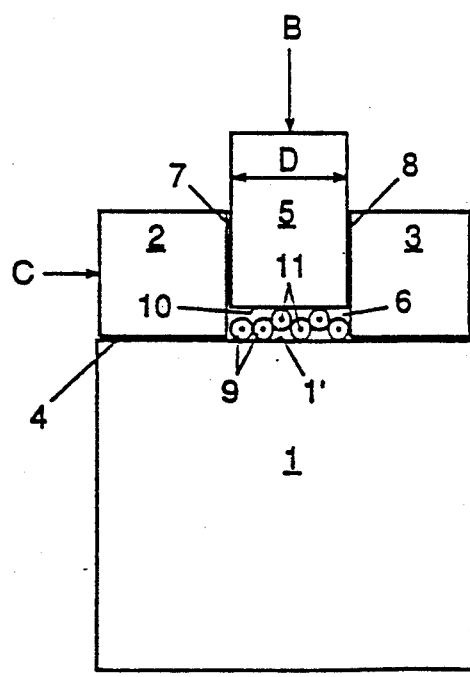
FIG. 2: shows a section of the assembly according to FIG. 1 along the line 20—20, in a first intermediate stage.
Figure 3:
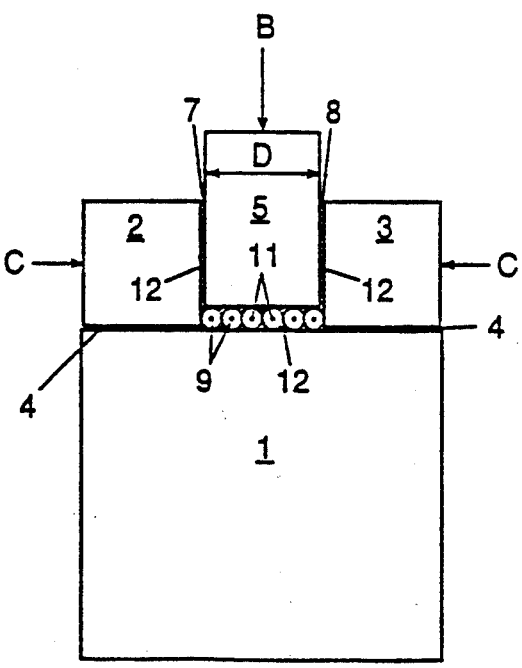
FIG. 3: is the same as FIG. 2, in a second intermediate stage.

FIG. 1 shows a three-dimensional view of an assembly which comprises a row of glass fibres to be positioned and to be fixed, or positioned and fixed, with the aid of the method according to the invention. The method will be explained on the basis of this figure. A first small glass block 2 and a second small glass block 3 are glued alongside one another onto a glass strip 1, which serves as substrate, using a flexible cement layer 4. Said small glass blocks are held accurately at a mutual spacing during gluing with the aid of a small glass plate 5. The small glass plate 5 has an accurately determined thickness D which is slightly, for example a few microns, less than the sum of the diameters of N fibres which will form the row of fibres. After the cement layer 4 has cured, the small plate 5 between the small glass blocks 2 and 3 is removed. This produces, between the small glass blocks 2 and 3, a groove 6 into which the small plate 5 fits with very narrow slits 7 and 8. The N fibres 9, in the present case six, are placed in the groove 6. To support the glass fibres 9, it may be advantageous if the strip 1 also extends over some length on either side of the groove 6 in the small glass blocks 2 and 3. At the same time, the upper face 1' of the glass strip 1 on either side of the small glass blocks 2 and 3 may be temporarily provided at some suitably chosen points with an adhesive material (not shown), for example double-sided adhesive tape, in order to hold the fibres 9 more easily in an ordered position while being placed in the groove 6 and to allow them to fan out to some extent outside the groove 6. At the same time, at least those parts of the fibres which end up in the groove 6 are preferably stripped of their 'coating'. In general, the fibres will not all immediately lie in parallel alongside one another, but will in some cases be crossed. To remove such crossovers, smoothing movements are carried out over and on the fibres 9 in the groove 6 using the small plate 5. For this purpose, the small plate 5 is provided with a pressing and smoothing face 10 on the underside and is also preferably provided with rounded corners (not shown) at the ends of said smoothing face. After each smoothing movement, a check is made on whether the fibres 9 are already lying without crossovers, for example by measuring the height at which the pressing and smoothing face 10 is still situated above the upper face 1' of the glass strip 1. If this height has become less than twice the diameter of a fibre 9 over the entire length of the groove 6, this is a sign that the crossovers have been removed by smoothing. In practice it has been found that 1 to 2 smoothing movements are sufficient in order to obtain the fibres alongside one another without crossovers in the groove 6. FIG. 2 shows a cross section of the assembly from FIG. 1 along the broken line 20—20, which cross section gives a picture of an intermediate stage at the instant it is found that crossovers are no longer present. The numbering corresponds to that of FIG. 1. In said intermediate stage, the fibres 9 lie in the groove 6 essentially in parallel and mutually contiguously. However, the cores 11 of the fibres 9 are still not all in a flat plane parallel to the upper face 1' of the glass strip 1. In order to achieve this, the small plate 5 is then pressed down further in the direction of the upper face 1' of the glass strip 1 over the entire length with a pressure force, indicated by arrow B, which is such that all the fibres 9 in the groove 6 are pressed against the upper face 1' of the glass strip 1 over their entire length. This is possible since the small glass blocks 2 and 3 can be pushed sideways to some extent as a result of their flexible gluing by means of the cement layer 4. To control this sideways pushing movement well, there are simultaneously exerting on the small glass blocks 2 and 3 oppositely directed transverse forces, along the arrows C, for example by means of a resilient clamping, which forces, together with the reaction force of the gluing ensure that the fibres 9 remain in intimate contiguous contact with one another in the groove 6. The fit of the small plate 5 between the small glass blocks 2 and 3 becomes less narrow under these circumstances, with the result that slits 7 and 8 existing on either side of the small plate 5 are to some extent widened. The assembly obtained in this way is heated to above the melting point of a suitably chosen type of wax while maintaining the pressure and transverse forces directed along the arrows B and C. The slits 7 and 8 and all the spaces 12 left over in the groove 6 between the glass fibres are then filled with a liquid wax of the type mentioned. The glass fibres 9 fanning out on either side of the groove 6 on the upper face 1' of the strip 1 may also be covered with a thin wax layer 13. The whole is then cooled to below said melting point. FIG. 3 shows a cross section of the assembly obtained after cooling, again along the broken line 20—20 indicated in FIG. 1. After cooling the transverse and pressure forces can be removed. The glass fibres 9 now lie carefully positioned and fixed in the groove 6. Under these circumstances, they form a planar row of mutually contiguous fibres with mutual centre-to-centre spacings which are completely determined by the diameters of the fibres used. The assembly is then sawn through along said cross section. The sawn surface obtained in this process, more particularly that part of the sawn surface in which the end faces of the glass fibres obtained by sawing through are situated is machined and polished to produce a coupling face suitable for coupling to a corresponding coupling face of an optical chip. The other free ends of the glass fibres are available for separate coupling.

An essentially symmetrical design of the assembly as shown in FIG. 1, with suitably chosen dimensions and with the saw cut chosen along the plane of symmetry, makes the simultaneous manufacture of two coupling devices possible.

The following data are representative of an embodiment:

glass fibres used: mean cladding diameter $d = 125$ micrometers with a variation of 0.35 micrometers;

$N = 16$;

normal window glass for the glass components, i.e. glass strip 1, small glass blocks 2 and 3, small glass plate 5;

dimensions:

glass strip; $8.0 \times 2.2 \times 1.0$ cm$^3$, small glass blocks: $2.0 \times 1.0 \times 0.5$ cm$^3$, small plate 5: $2.0 \times D \times 1.2$ cm$^3$, where $D = 1.995$ mm;

cement layer: commercially obtainable silicone polymer;

type of wax: a commercially available beeswax having a melting point of approximately 80° C.

Designs with N up to 34 inclusive have now been implemented.

In a row of fibres manufactured in this way, the exact position of the centrelines of the fibres is completely dependent on the variation in the diameters of the fibres used. Measurements on current standard glass fibres reveal that, with a mean cladding diameter of 125 micrometers, a maximum variation of 0.35 micrometers may occur. Such a standard glass fibre having a transverse mismatch of 1.5 micrometers with respect to its optimum position when coupled to a lightguide channel in the coupling face of a chip yields a coupling loss of 0.5 dB. This means that, if the mutual centre-to-centre spacing of the lightguide channels in the coupling face of a chip to be coupled is designed on the basis of the mean cladding diameter of the standard glass fibre, the coupling attenuation as a consequence of a transverse mismatch remains limited to 0.5 dB, even in rows consisting of 34 such fibres.

Instead of glass fibres, optical fibres made of another material having similar geometrical and optical properties can also be chosen.

Instead of glass a different material may be chosen for the components strip 1, small glass blocks 2 and 3, and small plate 5, provided that its hardness and its ability to be polished are similar to them of the material used for the optical fibres.

It is also possible for only one of the small blocks 2 and 3 to be glued flexibly to the substrate while the other small block is mounted on the substrate with a nonflexible gluing or is integral with the substrate.

We claim:

1. Method of positioning and fixing a number, $N \geq 2$, of optical fibres on an essentially flat substrate at least over a certain length in an essentially flat row and at mutually essentially equal spacings, the fibres lying contiguously alongside one another and the common lines of contact and the centre lines of the fibres lying essentially in a flat plane which method comprises the steps of:

placing and holding the fibres in position on the substrate, providing a curing filling material in the spaces between fibres themselves and between fibres and substrate in order to fix the fibres in said position, characterised in that the placing and fixing of the fibres in said contiguous position comprises the following steps:

mounting on the substrate two lateral bounding means of which at least one has a certain lateral flexibility and whose mutual spacing is a fraction smaller than the sum of the diameters of said number of optical fibres, a groove being formed between the bounding means for receiving the optical fibres, placing the fibres as far as possible alongside one another on the substrate in the groove, carrying out smoothing movements over the optical fibres in the groove with the aid of a small smoothing plate, which fits closely into the groove and is provided with a smoothing surface, until any crossovers have been removed from the fibres, pressing the fibres down into the groove against the substrate and holding them down with a small pressing-down plate provided with a pressing-down surface, filling the spaces around the small pressing down plate and the fibres in the groove with said curing filling material.

2. Method according to claim 1, characterised in that the bounding means are formed by two block-shaped bodies each of which has a height greater than the fibre diameter which bodies are attached to the substrate by means of a flexible gluing, the small smoothing plate being used as a spacer.

3. Method according to claim 2, characterised in that the small smoothing plate serves as pressing-down plate, the smoothing surface being used as pressing-down surface.

4. Method according to claim 1, characterised in that the small smoothing plate serves as pressing-down plate, the smoothing surface being used as pressing-down surface.

5. Method according to claim 1, characterised in that the filling step comprises the following substeps:

the at least local heating of regions around and in the groove to above the melting point of the filling material, allowing the filling material to flow in and between in said regions, cooling the heated regions to below said melting point.

6. Method of manufacturing a coupling device for coupling a number of optical fibres to a corresponding number of optical channels, comprising an essentially flat substrate, a number of optical fibres which are placed in parallel alongside one another at least over a certain length and which are accurately positioned and fixed on the substrate, the fibres lying contiguously alongside one another and the common lines of contact and the centre lines of the fibres lying essentially in a flat plane which device is provided with a coupling face in which the optical fibres emerge and which is suitable for said coupling, which method comprises the following steps:

placing and holding the fibres in position on the substrate, providing a curing filling material in the spaces between fibres themselves and between fibres and substrate in order to fix the fibres in said position, characterised in that the placing and fixing of the fibres in said contiguous position comprises the following steps:

mounting on the substrate two lateral bounding means of which at least one has a certain lateral flexibility and whose mutual spacing is a fraction smaller than the sum of the diameters of said number of optical fibres, a groove being formed between the bounding means for receiving the optical fibres, placing the fibres as far as possible alongside one another on the substrate in the groove, carrying out smoothing movements over the optical fibres in the groove with the aid of a small smoothing plate, which fits closely into the groove and is provided with a smoothing surface, until any crossovers have been removed from the fibres, pressing the fibres down into the groove against the substrate and holding them down with a small pressing-down plate provided with a pressing-down surface, filling the spaces around the small pressing down plate and the fibres in the groove with said curing filling material and in that the coupling face is provided by sawing through the assembly obtained in this way at the level of the groove perpendicularly to the optical fibres and polishing the sawn surface obtained in this process.

7. Method according to claim 6, characterised in that the assembly obtained has a plane of symmetry perpendicular to the groove and the fibres, and in that a sawing-through takes place along said plane.

8. Coupling device for coupling a number of optical fibres to a corresponding number of optical channels, comprising a row of a number, $N \geq 2$, of optical fibres placed contiguously alongside one another at least over a certain length, the common lines of contact and the centre lines of the fibres essentially lying in a flat plane, and a housing formed by a number of housing parts which enclose an elongated, essentially block-shaped space having a rectangular cross section with a height of approximately one times the fibre diameter and a width of approximately N times the fibre diameter, in which space the row of fibres is received, characterised in that one of the housing parts is plate-like and has an accurately determined thickness approximately equal to, but less than, N times the fibre diameter and is provided with a side face which touches the fibres in the fibre row over said length.

* * * * *